(12) United States Patent
Luo et al.

(10) Patent No.: US 8,549,709 B2
(45) Date of Patent: Oct. 8, 2013

(54) BUTTON ACTIVATED SPRING-LOADED HINGE ASSEMBLY

(75) Inventors: Yi-De Luo, Shenzhen (CN); Chao Duan, Shenzhen (CN); Chia-Hua Chen, Shindian (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 93 days.

(21) Appl. No.: 13/211,744

(22) Filed: Aug. 17, 2011

(65) Prior Publication Data

US 2012/0140387 A1 Jun. 7, 2012

(30) Foreign Application Priority Data

Dec. 3, 2010 (CN) .......................... 2010 1 0572411

(51) Int. Cl.
*E05F 1/08* (2006.01)
(52) U.S. Cl.
USPC ............................................. 16/303; 16/304
(58) Field of Classification Search
USPC ........ 16/303, 304, 284, 325, 341; 455/575.3;
361/679.27, 679.56
See application file for complete search history.

(56) References Cited

U.S. PATENT DOCUMENTS

| 7,653,968 | B2* | 2/2010 | Kubota | 16/330 |
| 7,818,845 | B2* | 10/2010 | Hu et al. | 16/330 |
| 7,913,359 | B2 | 3/2011 | Duan et al. | |
| 7,974,666 | B2* | 7/2011 | Kosugi et al. | 455/575.3 |
| 8,006,346 | B2* | 8/2011 | Zhang et al. | 16/303 |
| 8,240,007 | B2* | 8/2012 | Duan et al. | 16/330 |
| 2008/0201900 | A1* | 8/2008 | Kubota | 16/221 |
| 2009/0100641 | A1* | 4/2009 | Yang | 16/303 |
| 2009/0280874 | A1* | 11/2009 | Kosugi et al. | 455/575.3 |
| 2010/0050384 | A1* | 3/2010 | Zhang et al. | 16/303 |

FOREIGN PATENT DOCUMENTS

CN 101469738 A 7/2009

* cited by examiner

*Primary Examiner* — Victor Batson
*Assistant Examiner* — Matthew Sullivan
(74) *Attorney, Agent, or Firm* — Altis & Wispro Law Group, Inc.

(57) ABSTRACT

A hinge assembly includes a receiving seat, a control member, a clutch member, a follower, a main shaft and an elastic element. The receiving seat includes a first cam surface. The control member is releasably latched with the receiving seat. The cam includes a second cam surface. The follower includes a third cam surface engaging with the first cam surface or the second cam surface. The receiving seat, the control member, the cam and the follower are placed around the shaft. The elastic element provides an elastic force for the follower. After the control member is unlocked, the second cam surface engages with the first cam surface.

9 Claims, 4 Drawing Sheets

BUTTON ACTIVATED SPRING-LOADED HINGE ASSEMBLY

BACKGROUND

1. Technical Field

The present disclosure relates to hinge assemblies and, particularly, to a spring-loaded hinge assembly for foldable electronic devices such as portable telephones and portable computers that can activated by button.

2. Description of Related Art

Some hinge assemblies are spring-loaded and are used to assist in opening the foldable parts of mobile phones, which generally include a cover section and a body section. This kind of hinge assembly includes threaded engagement of its parts and is relatively complicated to manufacture. In addition, the threaded structure needs to be made of high strength material, which is costly.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present hinge assembly. Moreover, in the drawings, like reference numerals designate corresponding parts throughout the several views.

DETAILED DESCRIPTION

Figure 1:
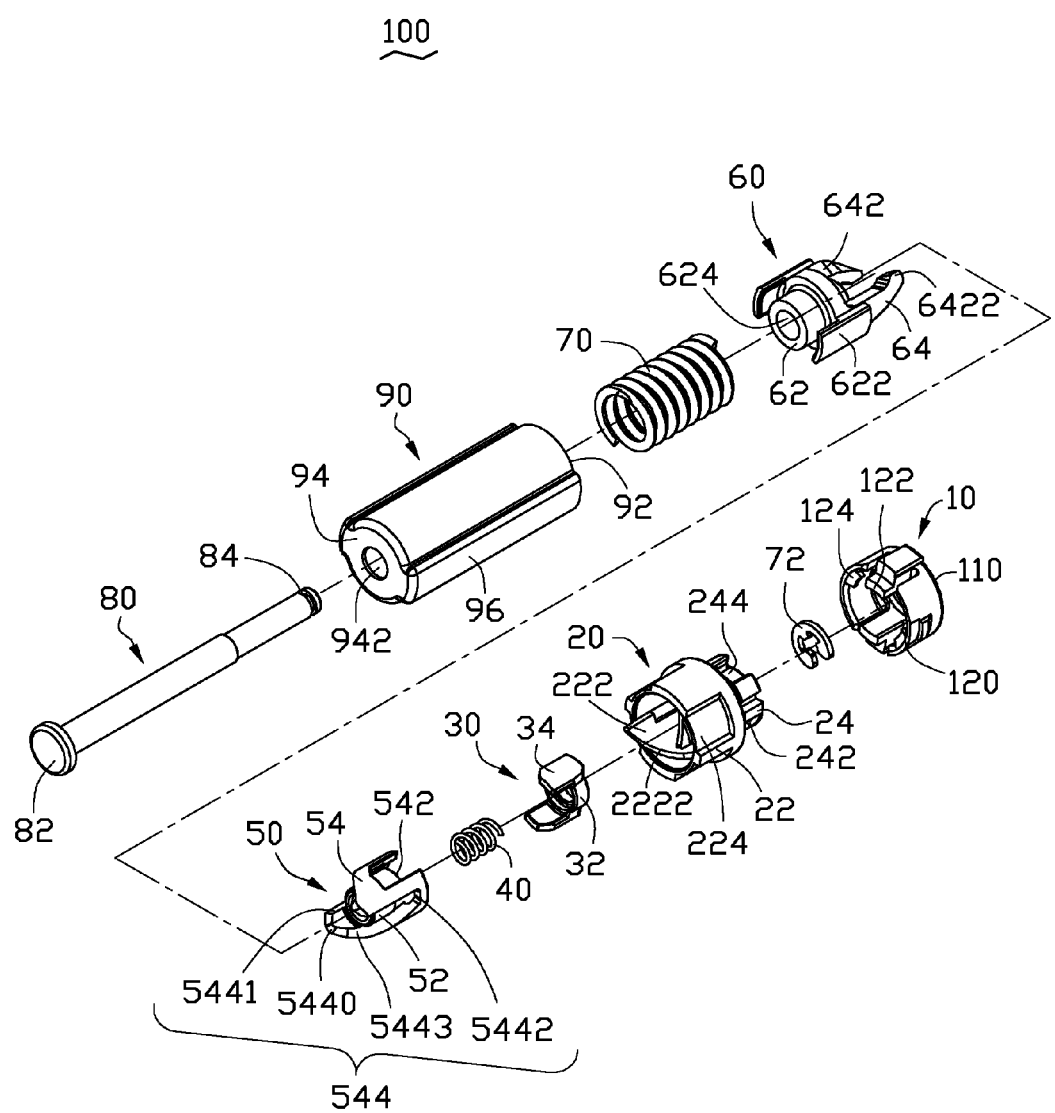
FIG. 1 is an exploded, isometric view of the exemplary embodiment of the hinge assembly shown in FIG. 1.
Figure 2:
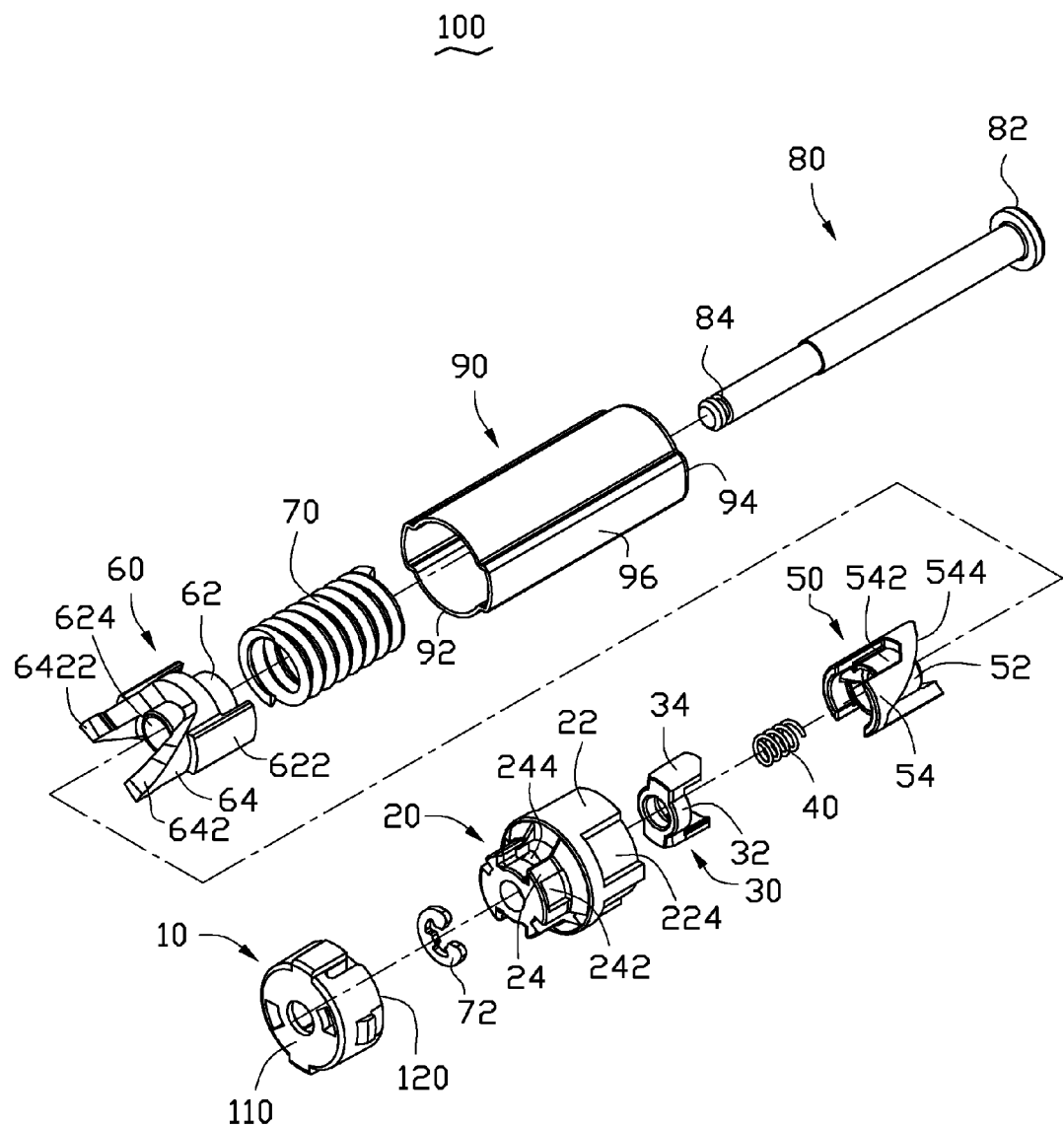
FIG. 2 is similar to FIG. 1, but viewed from another aspect.

Referring to the drawings in detail, FIGS. 1 and 2 show a hinge assembly 100 applied in a foldable electronic device such as a flip type mobile phone. The hinge assembly 100 can be used in other environments (e.g. cabinet doors). Although used here in a foldable electronic device, the hinge assembly 100 should not be considered limited in scope solely to foldable electronic devices.

The hinge assembly 100, in the embodiment illustrated, includes a button 10, a receiving seat 20, a control member 30, a return elastic member 40, a cam 50, a follower 60, a main elastic member 70, a washer 72, a shaft 80 and a sleeve 90.

The button 10 is substantially cylindrical, and includes a pressed end 110 and an opposite open end 120. Two symmetrical arms 122 and two symmetrical hooks 124 are formed on the open end 120. The button 10, when pressed, can press the control member 30 received in the receiving seat 20 so that the control member 30 is unlocked relative to the receiving seat 20.

The receiving seat 20 includes a first hollow cylinder 22 and a second hollow cylinder 24 axially connected to each other. Two cam walls 222 are formed on an inner circumferential wall of the first cylinder 22. Each cam wall 222 has a first cam surface 2222. The first cam surface 222 has a slanted edge surface for interacting with the follower 60. In this exemplary embodiment, an outer circumferential of the first cylinder 22 defines a plurality of seat grooves 224 for engaging with a body section of the electronic device so that the receiving seat 20 and the body section cannot rotate relative to each other. The second cylinder 24 has a smaller diameter than the first cylinder 22, and defines two symmetrical hook grooves 242 and two symmetrical limiting grooves 244. One end of the limiting grooves 244 communicates with an inside of the first cylinder 22, and another end of the limiting grooves 244 communicate with a free end of the second cylinder 24. The limiting grooves 244 can slidably receive the arms 122. The hooks 124 can be latched in the hook grooves 242.

The control member 30 can be received in the receiving seat 20. The control member 30 includes a hollow body 32 and two extending arms 34 integrally formed together. The body 32 abuts against the second cylinder 24 when the control member 30 is received in the receiving seat 20. The extending arms 34 are received in the limiting grooves 244, and only slide along the limiting grooves 244. The body 32 and portions of the extending arms 34 can be exposed from the limiting grooves 244 to allow the arms 122 to push the control member 30.

The return elastic member 40 is substantially cylindrical, and may be received in the control member 30 for returning the control member 30 to an original orientation it has been moved from.

The cam 50 includes an inner tube 52 and a cam portion 54 formed around an outer circumferential wall thereof. One end of the cam portion 54 defines two symmetrical slots 542, and another end of the cam portion 54 forms a second cam surface 544. The second cam surface 544 includes two peaks 5440, two straight edge surfaces 5441, two valleys 5442, and two sloped surfaces 5443. The extending arms 34 can be received in the slots 542.

The follower 60 includes a seat portion 62 and a cam portion 64. Two latching portions 622 are formed on the seat portion 62 for connecting to the sleeve 90. The seat portion 62 defines a passage 624. The cam portion 64 includes a third cam surface 642. The third cam surface 642 includes two peaks 6422. The width of the third cam surface 642 is substantially equal to the sum of the widths of the first cam surface 222 and the second cam surface 544.

The main elastic member 70 is substantially cylindrical, and may be fitted around the main shaft 80.

The shaft 80 extends through, in order, the receiving seat 20, the control member 30, the return elastic member 40, the cam 50, the follower 60, the main elastic member 70, and the sleeve 90. The shaft 70 forms a head portion 82 and a locking end 84 at opposite ends thereof. The washer 72 is, for example, made of metal, and may be latched to the locking end 84 to retain the above elements to the shaft 80.

The sleeve 90 is a substantially hollow cylinder, and includes an open end 92 and a partially-closed end 94. The partially-closed end 94 of the sleeve 90 defines a central hole 942. Opposite portions of the sleeve 90 are protruded outward to from two outer lengthwise blocks 96 for engaging with a cover section of the electronic device.

Figure 3:
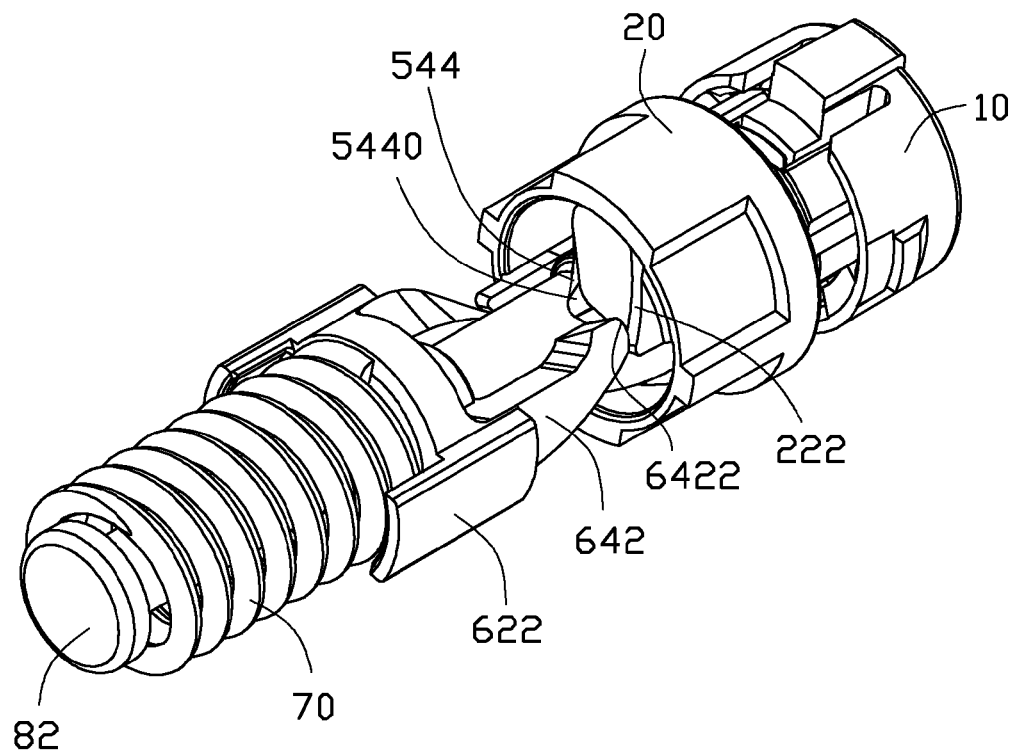
FIG. 3 is a partially assembled view showing the hinge assembly.
Figure 4:
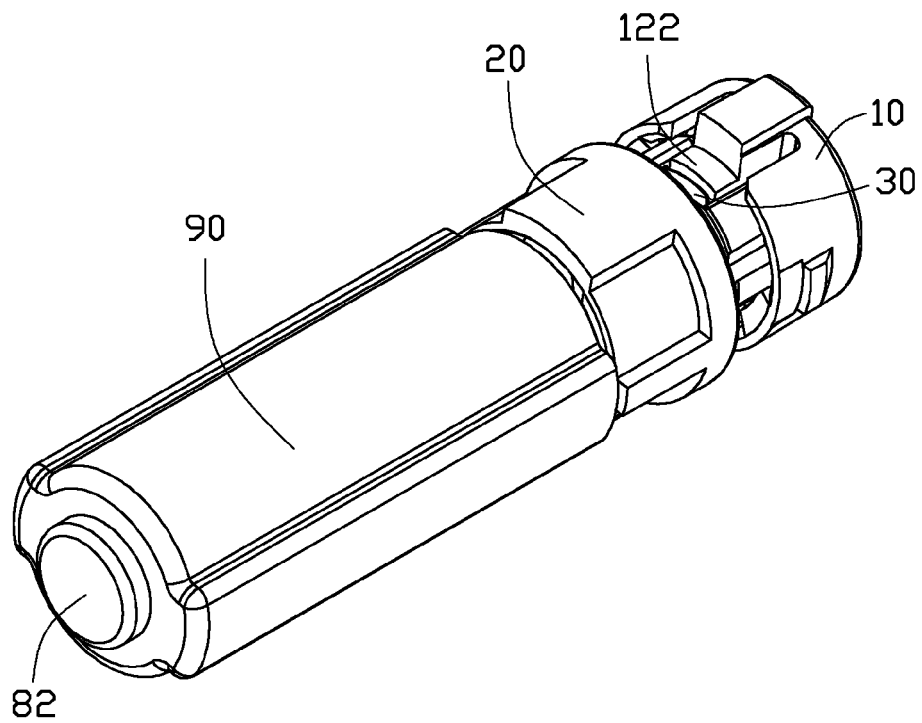
FIG. 4 is an assembled view showing the hinge assembly.

In assembly, referring to FIGS. 3 and 4, the control member 30, the return elastic member 40 and the cam 50, in that order, are received in the receiving seat 20. The body 32 abuts against an inside of the second cylinder 24 of the receiving seat 20. The extending arms 34 of the control member 30 are received in the limiting grooves 244. One end of the return elastic member 40 abuts against the control member 30, and another end of the return elastic member 40 abuts against the cam 50. Then, the main elastic member 70 and the follower 60 are received in the sleeve 90, and the latching portions 622 are engaged in the blocks 96 of the sleeve 90. The locking end 84 of the shaft 80 passes through the partially-closed end 94 of the sleeve 90, the main elastic member 70 and the follower 60, and is exposed from the sleeve 90. The assembled receiving seat 20 is fitted over the shaft 70. After the above elements are assembled, the washer 72 is latched on the locking end 84. Finally, the arms 122 of the button 10 are received in the limiting grooves 244 and abut against the control member 30. The hooks 124 are slidably received in the hook grooves 242 to prevent the button from separating from the receiving seat 20. Accordingly, the hinge assembly 100 is assembled.

The hinge assembly 100 is used to interconnect a main body and a cover of the electronic device. The seat grooves 224 of the receiving seat 20 are non-rotatably engages the main body, and the blocks 96 of the sleeve 90 are non-rotatably engages with the cover.

In a closed state of the electronic device, referring to FIG. 3, the inner portions of the peaks 6422 abut against the second cam surface 544 of the cam 50. Because the control member 30 is engaged with the receiving seat 20 and the cam 50 is engaged with the control member 30, the cam 50 cannot rotate relative to the receiving seat 20.

To open the electronic device, a user presses and releases the button 10. When pressed, the button 10 moves along an axial direction of the shaft 80, the arms 122 of the button 10 then push the control member 30 to move away from the button 10 in the axial direction of the shaft 80. The control member 30 moves along the axis until the extension arms 34 of the control member 30 move out of the limiting grooves 244 of the receiving seat 20, compressing the return elastic member 40 toward the cam 50. The cam 50 rotates relative to the follower 60 until the peaks 6422 of the follower 60 are separated from the second cam surface 544, and axially move to allow the outer portions of the peaks 6422 to abut against the first cam surface 222 of the receiving seat 20. Accordingly, the peaks 6422 of the follower 60 automatically rotate relative to the first cam surface 222 under the role of the main elastic member 70. When the follower 60 has rotated to a predetermined angle, the peaks 6422 of the follower 60 will come to rest against the straight edge surface 5441 of the second cam surface 544 of the cam 50. Rotation of the follower 60 causes the cam 50 to rotate until the peaks 6422 moves away from the first cam surface 222 and are received in the valleys 5442 of the cam 50. The elastic potential energy of the return elastic spring 40 then pushes the control member 30 to move toward the button 10. Furthermore, the follower 60 rotates the sleeve 90 so that the cover section of the electronic device is opened. When the electronic device is closed, the cover section rotates the sleeve 90. The peaks 6422 rotates relative to the second cam surface 544. Thus, the hinge assembly is completely closed.

As described above, the present embodiment provides a hinge assembly 100 for use with various portable devices, beyond the electronic device illustrated, and/or with other devices needing a hinge assembly that facilitates the achievement of fully open and fully closed positions.

It is believed that the present embodiments and their advantages will be understood from the foregoing description, and it will be apparent that different changes may be made thereto without departing from the spirit and scope of the disclosure or sacrificing all of its material advantages, the examples hereinbefore described merely being preferred or exemplary embodiments of the disclosure.

What is claimed is:

1. A hinge assembly for a foldable electronic device, comprising:
   a receiving seat including a first cylinder and a second cylinder integrally formed together, a first cam surface formed on an inner circumferential wall of the first cylinder;
   a control member releasably latched with the receiving seat;
   a cam including a second cam surface;
   a follower including a third cam surface engaging with the second cam surface;
   and
   a main shaft, the receiving seat, the control member, the cam and the follower placed around the shaft;
   an elastic element providing an elastic force for the follower; and
   wherein after the control member is unlocked, the third cam surface is separated from the second cam surface, and engages with the first cam surface; and
   wherein the receiving seat and the sleeve rotatably connect a cover section of the foldable electronic device to a body section of the foldable electronic device.

2. The hinge assembly as claimed in claim 1, wherein the receiving seat defines two limiting grooves, and the control member includes two extending arms slidably received in the limiting grooves.

3. The hinge assembly as claimed in claim 2, wherein the cam defines two slots, and the extending arms are received in the slots.

4. The hinge assembly as claimed in claim 1, further comprising a button including two hooks, wherein the second cylinder defines two opposite hooks grooves, the hooks are slidably latched into the hook grooves.

5. The hinge assembly as claimed in claim 1, wherein the width of the third cam surface is substantially equal to the sum width of the first cam surface and the second cam surface.

6. A foldable electronic device having at least two components hinged together by a hinge assembly, the hinge assembly comprising:
   a receiving seat including a first cam surface;
   a control member releasably latched with the receiving seat;
   a cam including a second cam surface;
   a follower including a third cam surface engaging with the second cam surface, the width of the third cam surface being substantially equal to the sum width of the first cam surface and the second cam surface; and
   a main shaft, the receiving seat, the control member, the cam and the follower placed around the shaft;
   an elastic element providing an elastic force for the follower; and
   wherein after the control member is unlocked, the third cam surface is separated from the second cam surface, and engages with the first cam surface.

7. The foldable electronic device as claimed in claim 6, wherein the receiving seat defines two limiting grooves, and the control member includes two extending arms slidably received in the limiting grooves.

8. The foldable electronic device as claimed in claim 6, wherein the receiving seat includes a first cylinder and a second cylinder integrally formed together, and the first cam surface is formed on an inner circumferential wall of the first cylinder.

9. The foldable electronic device as claimed in claim 8, further a button including two hooks, wherein the second cylinder defines two opposite hooks grooves, the hooks are slidably latched into the hook grooves.

* * * * *